June 25, 1946.  J. D. BUCHANAN  2,402,729
VARIABLE RESTRICTOR
Filed Dec. 20, 1944
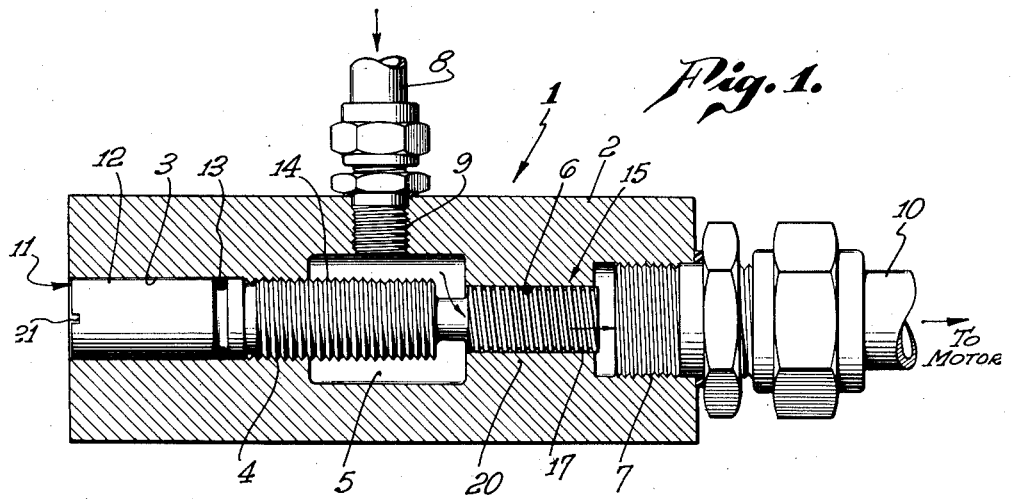
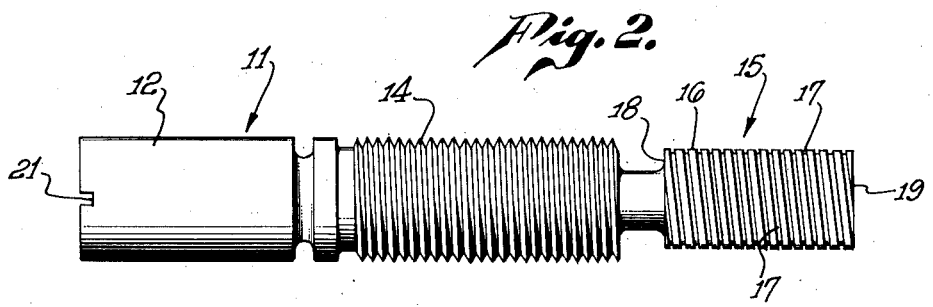
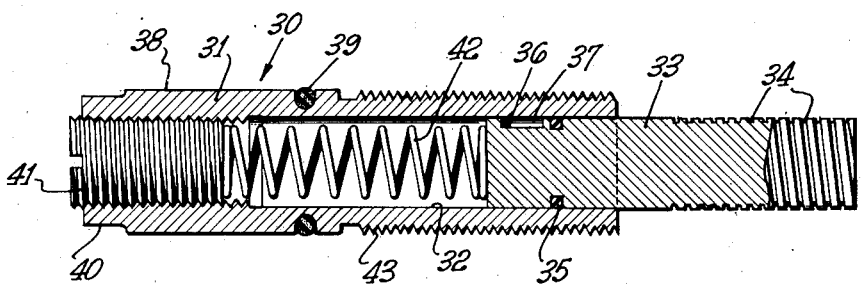
J. D. BUCHANAN,
INVENTOR.
BY
ATTORNEY.

Patented June 25, 1946

2,402,729

UNITED STATES PATENT OFFICE 2,402,729

VARIABLE RESTRICTOR

J. D. Buchanan, Burbank, Calif.

Application December 20, 1944, Serial No. 568,994

6 Claims. (Cl. 138—43)

The invention relates to a variable restrictor for variably or adjustably restricting or impeding fluid flow.

According to the invention, there is provided an elongated restrictor channel in the path of the fluid flow, with means for varying the effective length of the channel to thereby vary the impedance offered to the flow. The amount of such restriction or impedance may be varied either manually or automatically in response to pressure conditions.

For further details of the invention, reference may be made to the drawing wherein Fig. 1 is a longitudinal, sectional view of a variable restrictor arranged for manual adjustment, according to the present invention.

Fig. 2 is an enlarged plan view of the adjustable restrictor element of Fig. 1.

Fig. 3 is a longitudinal, sectional view of a modified form of restrictor for automatically varying the restriction in accordance with pressure conditions.

Referring in detail to the drawing, the variable restrictor 1 in Fig. 1 comprises a casing 2 having in axial alignment a smooth bore 3, a threaded bore 4, an enlarged chamber 5, a smooth bore 6 and a threaded bore 7 serving as an outlet. Oil or other fluid under pressure is supplied by a pipe 8 which discharges into chamber 5. Pipe 8 may be threaded into the threaded bore 9 which opens into chamber 5, and the outlet pipe 10 may be threaded into the threaded bore 7 which communicates with the outer end of smooth bore 6. Extending from the smooth bore 3 through the smooth bore 6 is a restrictor plug 11 having a smooth cylindrical outer end 12 and ring seal 13 which slidingly fit in the smooth bore 3. Plug 11 also has screw threads 14 which fit in the threaded bore 4. The length of the screw threads 14 along the axis of plug 11 may be as long as the smooth bore 6 to permit the restrictor portion 15 of the plug 11 to be wholly inserted into or wholly withdrawn from the smooth bore 6. The restrictor portion 15 of the plug 11 has an outer cylindrical periphery 16 which slidingly fits in the smooth bore 6. In the periphery 16 is arranged a helical restrictor channel 17, one end 18 of which opens into the chamber 5 and the other end 19 of which opens into the outlet at the bore 7.

The channel 17 is illustrated as having a square cross section, although other shapes may be employed. While other dimensions may be employed, it has been found that when using oil under a pressure of 500 lbs. p. s. i. in the inlet 8 and when using a square channel, as shown, satisfactory results are obtained with a channel 17 having a depth and width of .02 inch.

A suitable hydraulic motor may be connected to the outlet 10, and the restrictor 1 may be employed to adjust the fluid pressure supplied to the motor from the inlet 8, as follows. The wall 20 of the smooth bore 6 serves as a sheath which covers the open side of the groove 17 to confine the fluid to flow through that portion of groove 17 which is covered by the wall 20. The effective length of the restrictor portion 15 may be varied or adjusted by sliding the restrictor portion 15 in or out of bore 6 a desired amount, and for this purpose the outer end of plug 11 is provided with a kerf 21 so that a screw driver may be applied thereto to rotate plug 11 and slide the restrictor portion 15 to a desired position relatively to the bore 6. For example, if the plug 11 is rotated so as to withdraw one-half of restrictor portion 15 from bore 6, that portion of channel 17 which extends in the enlarged chamber 5 does not offer any substantial restriction to the flow of fluid, the amount of restriction due to channel 17 then being that amount due to the assumed one-half of the length of the restrictor portion 15 which is in the bore 6 and covered by the wall 20.

Heretofore, it has been proposed to employ a needle valve in order to vary the restriction offered to fluid flow, but this has the following disadvantages: The needle valve is quite sensitive, as a small change in its adjustment produces a considerable change in the pressure; also, when using a high fluid pressure, the needle valve and its seat become worn due to the high pressure, and hence, a duplication of the adjustment of the needle valve will not produce a duplication of the regulated pressure. These disadvantages are overcome, according to the present invention, because channel 17 comprises many turns and its over-all length is rather great, whereby a change of the angular position of plug 11, by a small amount, produces a percentage change in the length of channel 17 which is extremely small in comparison to the change in restriction which would be produced when changing the setting of a needle valve by the same angular amount. Also, the restrictor of the present invention is not subject to wear comparable to that encountered with a needle valve, because the restriction is not confined to a very small area as in the case of the needle valve, but, instead, is produced over a comparatively large area provided by the elongated groove 17 and the elongated smooth bore 6.

According to the modification shown in Fig. 3, the restriction may be effected automatically in response to pressure conditions, instead of manually, as in Fig. 1. In Fig. 3, the restrictor plug 30 is provided with a tube 31 having a bore 32 in which slidingly fits a restrictor plug 33 having a channel 34 like channel 17. The plug 33 has a ring seal 35 and plug 33 is retained in the tube 31 by a pin 36 secured at its ends to the tube 31. Plug 33 is provided with an elongated groove 37 to permit loose play, axially, of the plug 33 in the tube 31. The tube 31 has a cylindrical exterior 38 and a ring seal 39 which slidingly fit in the smooth bore 3 in Fig. 1. The outer end of tube 31 is provided with a non-circular portion 40 so that a wrench may be applied thereto, to manually adjust the position of the restrictor 30 in the casing 2 in Fig. 1. The tube 31, in its outer end, has an adjustable screw plug 41 between the inner end of which and the outer end of plug 33 is arranged a compression spring 42. Tube 31 also has screw threads 43 which fit in the threaded bore 4.

Assuming that the restrictor 30 is mounted in the casing 2, the operation is as follows, with the channel 34 wholly or partly within the smooth bore 6. If, for example, the motor connected to pipe 10 is employed to drive a machine tool, with a constant volume of fluid under pressure being fed from pipe 8 to the motor, when the motor slows down due to an increase in the load on the motor, such as a very heavy cut on the workpiece, the back pressure in the outlet 10 builds up because the motor has slowed down and is not taking a normal volume of the fluid supply. This increase in back pressure in the outlet 10 pushes plug 33 outwardly along the bore 6 against the action of spring 42, thereby reducing the restriction offered by channel 34 with a consequent increase in the fluid pressure from inlet 8 on the motor, whereby the flow is restored and the motor speed is brought up to normal.

It has been found that the amount of variation in the volume of fluid flow through casing 2 for a given change in the setting of the restrictor plug 11 depends upon the position of the restrictor portion 15 in its bore 6. When the length of restrictor portion 15 in bore 6 is zero and that length is gradually increased, the flow of fluid through the casing decreases at a very rapid rate. As the restrictor length is increased, this rate gradually decreases, apparently according to a logarithmic function, as the restrictor length 15 in bore 6 is increased. Hence, if the normal operating condition is taken as one where the restrictor 15 is wholly within the bore 6, the operator has considerable latitude in resetting the restrictor to that position, because a small difference in the angular position of plug 11 makes only a slight difference in the pressure when the restrictor portion 15 is wholly or substantially wholly within the bore 6; whereas, it is very sensitive for high volume flow when the restrictor portion 15 is wholly withdrawn from or only slightly inserted in the bore 6.

In the case of Fig. 3, the normal setting may be on a sensitive part of the curve; that is, with groove 34 partly removed from bore 6, so that the movement of plug 33 for the distance allowed by groove 39 may effect a substantial change in the volume flow.

It will be apparent that various modifications may be made in the invention. For example, the parts may be reversed by providing restrictor 15 with a smooth cylindrical periphery and by arranging a groove like 17 in the bore 6. Also, if desired, the restrictor plug 11 may be stationary and the wall 20 may be adjusted relatively thereto. However, the forms illustrated are preferred, due to simplicity of manufacture.

I claim:

1. A fluid restrictor comprising a casing having a smooth bore, said casing having an enlarged chamber at one end of said bore, an inlet communicating with said chamber, an outlet at the other end of said bore, an adjustable plug slidably fitting in said bore, an elongated helical channel around said plug, said channel having a small cross sectional area to impede the flow from said inlet to said outlet through that portion of the channel in said bore, and means responsive to fluid pressure in said outlet for varying the position of said plug in said bore to vary the length of said channel in said bore.

2. A fluid restrictor comprising a casing having in axial alignment a threaded bore, an enlarged chamber, and a smooth bore, said threaded bore opening into said chamber, said chamber opening into said smooth bore, an inlet for said chamber, an outlet for said smooth bore, an adjustable restrictor plug, a system having a hose slidably receiving said plug, said stem having a threaded portion for said threaded bore, said plug also having a restrictor portion slidably fitting said smooth bore, a helical channel around the periphery of said restrictor portion, one end of said channel opening into said chamber and the other end of said channel opening into said outlet, a screw plug in said stem, and a compression spring in the bore of said stem between said screw plug and said restrictor plug.

3. An adjustable fluid restrictor comprising a casing having an inlet and an outlet, a restrictor member having an elongated channel with one end of said channel communicating with said inlet and the other end thereof communicating with said outlet, a sheath means between said inlet and outlet, said sheath means slidably fitting on said channel, and means responsive to fluid pressure in said outlet for relatively moving said sheath means and said restrictor member to vary the length of the fluid path confined to that portion of said channel covered by said sheath means.

4. An adjustable fluid restrictor comprising a casing having an inlet and an outlet, a restrictor member having an elongated channel with one end of said channel communicating with said inlet and the other end thereof communicating with said outlet, a sheath means between said inlet and outlet, said sheath means slidably fitting on said channel, and means responsive to a variation of back pressure in said outlet to relatively move said sheath means and said restrictor member to vary the length of the fluid path confined to said channel by said sheath means.

5. A fluid restrictor, according to claim 1, said fluid pressure responsive means comprising spring means opposing expulsion of said plug from said smooth bore by back pressure in said outlet.

6. A pressure regulator comprising a casing having an inlet and an outlet, means providing an elongated restrictor channel between said inlet and outlet, and fluid pressure responsive means for varying the effective length of said channel.

J. D. BUCHANAN.